(12) United States Patent
Taillefer (10) Patent No.: US 8,671,394 B1
(45) Date of Patent: Mar. 11, 2014

(54) MONITORING TEST STEPS IN TEST ENVIRONMENTS

(75) Inventor: Greg Taillefer, Wrentham, MA (US)

(73) Assignee: The MathWorks, Inc., Natick, MA (US)

( * ) Notice: Subject to any disclaimer, the term of this patent is extended or adjusted under 35 U.S.C. 154(b) by 1258 days.

(21) Appl. No.: 10/723,943

(22) Filed: Nov. 26, 2003

(51) Int. Cl.
*G06F 9/44* (2006.01)

(52) U.S. Cl.
USPC ............ 717/125; 717/100; 717/105; 717/124

(58) Field of Classification Search
USPC .......................................................... 717/125
See application file for complete search history.

(56) References Cited

U.S. PATENT DOCUMENTS

| | | | |
|---|---|---|---|
| 5,671,351 A * | 9/1997 | Wild et al. .................. | 714/38 |
| 6,401,220 B1 * | 6/2002 | Grey et al. .................. | 714/33 |
| 6,421,822 B1 * | 7/2002 | Pavela ......................... | 717/125 |
| 6,587,969 B1 * | 7/2003 | Weinberg et al. ........... | 714/46 |
| 6,654,911 B1 * | 11/2003 | Miles .......................... | 714/38 |
| 6,957,420 B2 * | 10/2005 | Hand et al. .................. | 717/125 |
| 6,978,440 B1 * | 12/2005 | Pavela ......................... | 717/125 |
| 7,055,138 B2 * | 5/2006 | Sutton ......................... | 717/125 |
| 7,100,150 B2 * | 8/2006 | Polk ............................ | 717/124 |
| 7,185,315 B2 * | 2/2007 | Sharp et al. ................. | 717/109 |
| 7,228,524 B2 * | 6/2007 | Bailey et al. ................ | 717/100 |
| 2002/0066072 A1 * | 5/2002 | Crevatin ..................... | 717/104 |
| 2003/0046657 A1 * | 3/2003 | White ......................... | 717/105 |
| 2004/0107415 A1 * | 6/2004 | Melamed et al. ........... | 717/124 |
| 2004/0123272 A1 * | 6/2004 | Bailey et al. ................ | 717/125 |
| 2004/0153788 A1 * | 8/2004 | Krietemeyer et al. ...... | 714/25 |
| 2006/0048100 A1 * | 3/2006 | Levy et al. .................. | 717/124 |

OTHER PUBLICATIONS

Hendrix et al., An extensible framework for providing dynamic data structure visualizations in a lightweight IDE, Oct. 2005, 5 pages.*

* cited by examiner

*Primary Examiner* — Thuy Dao
(74) *Attorney, Agent, or Firm* — Harrity & Harrity, LLP (57) ABSTRACT

Methods and systems for monitoring test steps to determine whether the test steps are executable in a test environment are disclosed. The test environment tests various resources, such as programs, data and functions in the electronic devices. The test environment provides a user interface that enables users to edit a sequence of test steps executed in the test environment. The test environment may provide visual representations of the test steps in the sequence of test steps. When the users select a test step in the sequence of test steps, the selected test step is monitored to inform the users whether the selected test step is executable in the test environment. The properties of the selected test step may also be provided and, if the selected test step is not executable in the test environment, users may be informed of the properties that should be specified to make the selected test step executable in the test environment.

23 Claims, 12 Drawing Sheets

MONITORING TEST STEPS IN TEST ENVIRONMENTS

FIELD OF THE INVENTION

The present invention relates generally to interactive test environments and more particularly to methods and systems for monitoring test steps and informing users whether the test steps are executable in the interactive test environments.

BACKGROUND OF THE INVENTION

Computers may include software tools that run on the computers and perform desired functions. For example, computers may include software tools that provide programming environments. The programming tools enable users to create programs that can be executed on the computers to perform specific functions designed by the users. The programming tools may provide textual and graphical environments for generating the programs. The MATLAB® and SIMULINK® environments, both from The MathWorks Inc. of Natick, Mass., are exemplary software tools that provide textual and graphical programming environments, respectively. The MATLAB® environment integrates mathematical computing, visualization, and a powerful language to provide a flexible environment for technical computing. The SIMULINK® environment enables users to design a block diagram for a target system, simulate the system's behavior, analyze the performance of the system, and refine the design of the system. Computers may also include software tools that provide other functions, such as reading/writing data from/to external devices. MATLAB® Toolboxes, from The MathWorks Inc. of Natick, Mass., provide exemplary software tools that enable the computers to perform a plurality of functions, including interfacing with the external devices.

The programs generated by users with the programming tools need to be tested to check whether the programs operate properly as designed. The functions provided by the programming tools also need to be tested to check whether the functions are properly performed in a given setting. Furthermore, the data generated in the execution of the programs or obtained from external devices need to be tested to check the characteristic of the data. In order to test the programs, data and functions, the test steps for testing programs, data and functions should be executable in the test environments.

SUMMARY OF THE INVENTION

The present invention provides test environments for testing resources that run on electronic devices. The present invention provides integrated test environments for testing various types of resources. The resources may include software tools that provide textual or graphical programming environments in which users are able to generate programs. The programs or parts of the programs may be tested to check whether the programs work as designed in the test environments. The resources may also include software tools that provide other functions, such as data transferring from/to external devices. The functions provided by the software tools may be tested to check whether the function is properly performed in different settings. The test environments of the present invention enable the users to edit test steps in which the resources are tested. The user may edit the sequence of the test steps. The users may also input the parameters and variables for calling the functions of the resources in the test steps. The present invention monitors the properties of the test steps to determine whether the test steps are executable in the test environments.

The test environment of some embodiments of the present invention may provide a user interface to enable users to edit the sequence of test steps. The user interface of the present invention may provide visual representations of the test steps in the sequence of test steps. When the users select a test step in the sequence of test steps, the present invention may monitor the selected test step and provides another user interface element associated with the representation of the selected test step to inform the users whether the selected test step is executable in the test environment of the present invention. The present invention may also provide the properties of the selected test step and, if the selected test step is not executable in the test environment, the present invention may inform the users of the properties of the selected test step that should be specified to make the selected test step executable in the test environment.

In accordance with one aspect of the present invention, a method is provided for monitoring test steps to indicate whether the test steps are executable in the test environment provided in an electronic device. A first user interface element is provided on the display of the electronic device to present a sequence of test steps. When one of the test steps in the sequence of test steps is selected, a second user interface element is provided associated with the representation of the selected test step. The second user interface element informs users whether the selected test step in the sequence of test steps is executable in the test environment of the electronic device.

In another aspect of the present invention, a method is provided for monitoring test steps to determine whether the test steps are executable in the test environment provided in an electronic device. A sequence of test steps is provided on the display of the electronic device. When one of the test steps in the sequence of test steps is selected, a user interface element is provided on the display to present information on the properties of the selected test step in the sequence of test steps. If the selected test step is not executable in the test environment, another user interface element is provided to indicate the properties of the selected test step that should be specified to make the selected test step executable in the test environment.

In still another aspect of the present invention, a medium holding instructions executable in an electronic device is provided. The electronic device provides test environments for testing test steps in the electronic device. A first user interface element is presented on the display of the electronic device. The first user interface element displays visual representations of a sequence of test steps. When one of the test steps in the sequence of test steps is selected, a second user interface element is provided associated with the representation of the selected test step. The second user interface element informs users whether the selected test step in the sequence of test steps is in a condition executable in the test environment of the electronic device.

In yet still another aspect of the present invention, a medium holding instructions executable in an electronic device is provided. The electronic device provides test environments for testing test steps in the electronic device. A sequence of test steps is provided on the display of the electronic device. When one of the test steps in the sequence of test steps is selected, a user interface element is provided on the display. The user interface presents information on properties of the selected test step in the sequence of test steps. If the selected test step is not executable in the test environment, another user interface element is provided to indicate the properties of the selected test step that should be specified to make the selected test step executable in the test environment.

By monitoring test steps and informing users whether the test steps are executable in the test environments provided in electronic devices, the present invention enables the users to easily acknowledge the status of the test steps. In addition, by providing the properties of the test steps that should be specified to make the test steps executable in the test environment, the users are able to fix the status of the test steps that are not executable in the test environments. As a result, the present invention saves time to test each of the test steps in the test environments.

BRIEF DESCRIPTION OF THE DRAWINGS

The aforementioned features and advantages, and other features and aspects of the present invention, will become better understood with regard to the following description and accompanying drawings, wherein.

DETAILED DESCRIPTION

The illustrative embodiment of the present invention concerns test environments in electronic devices. The illustrative embodiment of the present invention provides integrated test environments for testing various types of software tools. The test environments in the illustrative embodiment of the present invention may test programs generated in programming tools including textual and graphical programming tools. The test environments in the illustrative embodiment of the present invention may also test the functions of software tools that operate in a given condition. The test environments in the illustrative embodiment of the present invention provide a graphical user interface that enables users to edit a sequence of test steps for testing the programs and functions of the software tools. The user interface may enable the users to add one or more of the test steps to the sequence of test steps. When a test in the sequence of test steps is selected, the illustrative embodiment of the present invention monitors the selected test step and informs the users whether the selected test step is executable in the test environments. The illustrative embodiment of the present invention also provides the properties of the selected test step. If some of the properties need to be specified to execute the selected test step, the graphical user interface provides the users with information on the properties of the selected test step that should be specified to make the selected test step executable in the test environments.

Figure 1:
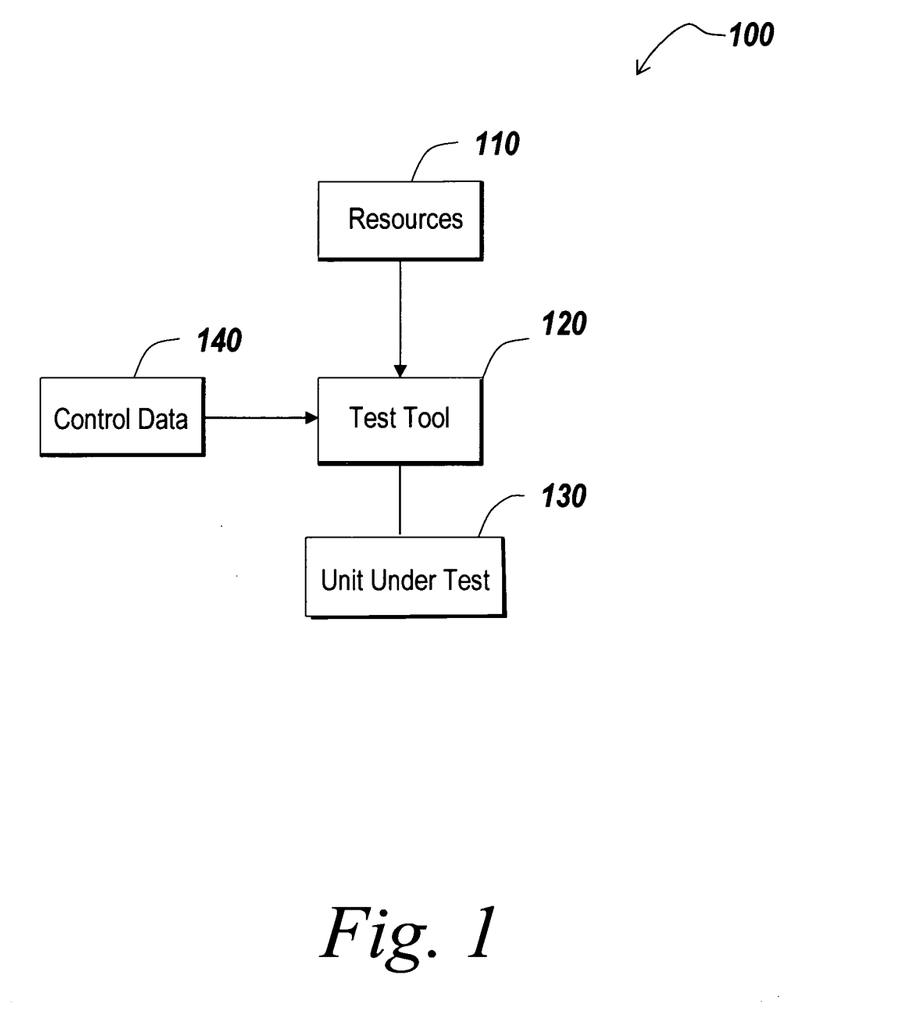
FIG. 1 is an exemplary test environment that may be implemented in the illustrative embodiment of the present invention.

FIG. 1 is an exemplary test environment 100 in the illustrative embodiment of the present invention. The test environment 100 includes a test tool 120 in which various types of resources 110 are tested as a Unit Under Test (UUT) 130. One of skill in the art will appreciate that the resources 100 may include software tools and hardware tools. The resources 110 are described below in more detail with reference to FIG. 2. Users may input control data 140 for setting test steps executed in the test environment 100. The users may input control data 140 for making a sequence of the test steps that specifies the sequence of the resources to be test in the test tool 120. The users may also input the variables and parameters of the test steps that can be used as arguments to call the functions provided by the resources 110. With different variables and parameters of the test steps, the functions of the resources may return different outputs. The UUT 130 may include some of the resources 110 selected by the users in the test tool 120 and be tested in the test tool 120 with the variables and parameters entered by the users. One of skill in the art will appreciate that the UUT 130 may include software tools and hardware tools.

The illustrative embodiment of the present invention provides an integrated test environment. 100 for testing various types of resources. The test environment 100 may test the programs generated in both textual and graphical programming tools. The test environment 100 may also test the functions provided by the resources 110, such as interfacing with external devices to transfer data from/to the external devices. One of skill in the art will appreciate that the functions tested in the test environment 100 are not limited to interfacing of the electronic devices, but rather include any other functions performed by the resources 110. The test environment 100 may further test data, such as the limit values of the data. The data may be obtained from the external devices or generated by the execution of the programs. One of skill in the art will appreciate that the programs, data, functions are illustrative objects tested in the test environment 100 and the test environment 100 may test other resources, such as resources relating to the hardware of electronic devices.

Figure 2:
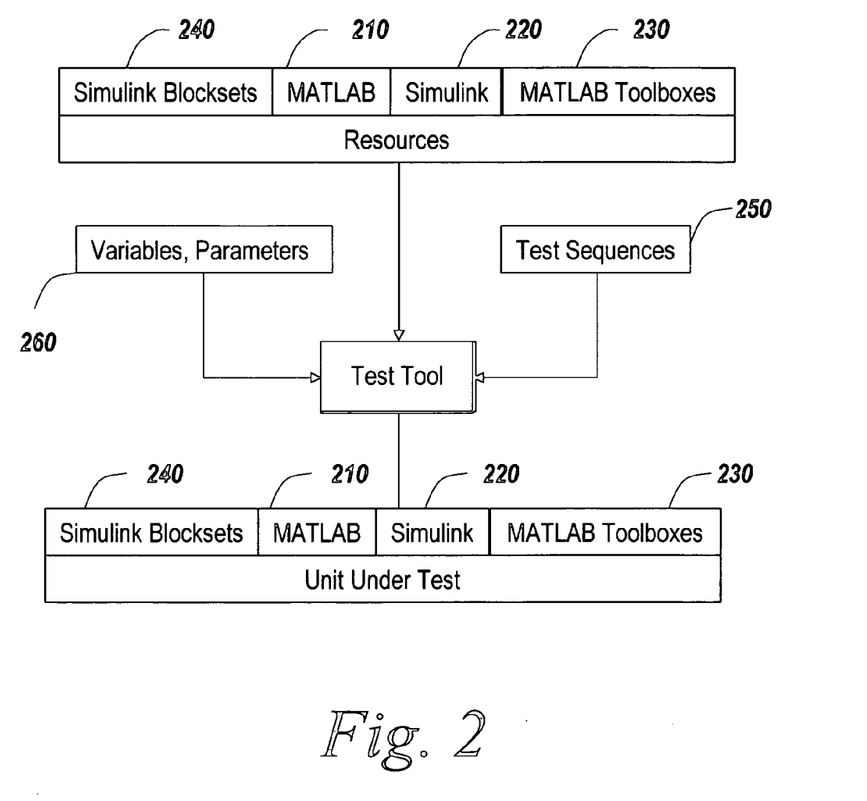
FIG. 2 shows the details of the test environment in the illustrative embodiment of the present invention depicted in FIG. 1.

FIG. 2 shows details of the exemplary test environment 100 in the illustrative embodiment of the present invention depicted in FIG. 1. The resources 110 include software tools, such as the MATLAB® 210 software tool, the SIMULINK® 220 software tool, MATLAB® Toolboxes 230, and SIMULINK® Blocksets 240, all from The MathWorks, Inc. of Natick, Mass. The Unit Under Test (UUT) 130 may include some of the resources 110 selected to be tested in the test tool 120. One of skill in the art will appreciate that the software tools depicted in FIG. 2 are illustrative and the resources 110 may include other software tools.

The MATLAB® 210 software tool is an intuitive language and provides a technical computing environment. The MATLAB® 210 environment integrates mathematical computing, visualization, and a powerful technical language. The MATLAB® 210 environment provides core mathematics and advanced graphical tools for data analysis, visualization, and algorithm and application development. The MATLAB® 210 environment provides a range of computing tasks in engineering and science, from data acquisition and analysis to application development. Built-in interfaces of the MATLAB® 210 environment enable users to access and import data from instruments, files, and external databases and programs. In addition, the MATLAB® 210 environment enables the users to integrate external routines written in C, C++, Fortran, and JAVA with the MATLAB® 210 applications. The test tool 120 provides a test environment 110 that enables users to test files generated using the MATLAB® 210 applications.

The SIMULINK® 220 software tool enables users to design block diagrams for target systems, simulate the systems' behavior, analyze the performance of the systems, and refine the design of the systems. The SIMULINK® 220 software tool provides block diagram environments that allow users to draw, edit, annotate, save, and print out the block diagrams of the target systems. The SIMULINK® 220 environment provides a graphical user interface (GUI) component that allows drafting of block diagram models by users. The visual representation of the target systems in the block diagrams allows for a convenient interpretation of the target systems and provides an intuitive notion of the behavior of the target systems. The SIMULINK® environment also allows users to simulate the designed target systems to determine the behavior of the systems. The test tool 120 provides a test environment 110 that enables users to test model files generated using the SIMULINK® 220 software tool.

MATLAB® Toolboxes 230 include a plurality of Toolboxes, such as Instrument Control Toolbox. The Instrument Control Toolbox provides communications with instruments, such as oscilloscopes and function generators, directly from the MATLAB environment. Instrument Control Toolbox supports for GPIB, VISA, TCP/IP, and UDP communication protocols. Users may generate data to send out to an instrument, or read data for analysis and visualization. The transferred data can be binary or ASCII. The Instrument Control Toolbox supports both synchronous and asynchronous read and write functions. A synchronous operation blocks access to the command line until the read or write is completed. An asynchronous operation does not block access to the command line, and additional MATLAB® commands can be issued while the read or write operation executes. The test tool 120 provides a test environment 110 that enables users to test functions provided by MATLAB® Toolboxes 230 in a given condition.

SIMULINK® Blocksets 240 contain application specific blocks that support the modeling and simulation of systems in the block diagram environment provided by the SIMULINK® software tool. SIMULINK® Blocksets 240 provide blocks that are incorporated into the models of the systems, and include subsets, such as DSP Blockset, Fixed-point Blockset and Communications Blockset, from The MathWorks, Inc. of Natick, Mass. The Blocksets provide utilities for the development and integration of models for the systems and sub-systems of the systems. The test tool 120 provides a test environment 110 that enables users to test a block or blocks provided by SIMULINK® Blocksets 240.

The test tool 120 may receive control data for testing the resources 110, which includes the sequence of test step and the variables and parameters of the test steps. The test tool 120 provides an integrated test environment 100 for testing various types of resources in a sequence of test steps. The test tool 120 may provide a graphical user interface that enables users to input the data for the sequence of test steps specifying the sequences of the resources 110 to be tested. The user interface may also enable users to input data for the variables and parameters of the test steps. The test tool 120 will be described below in more detail with reference to FIGS. 4A-7C.

Figure 3:
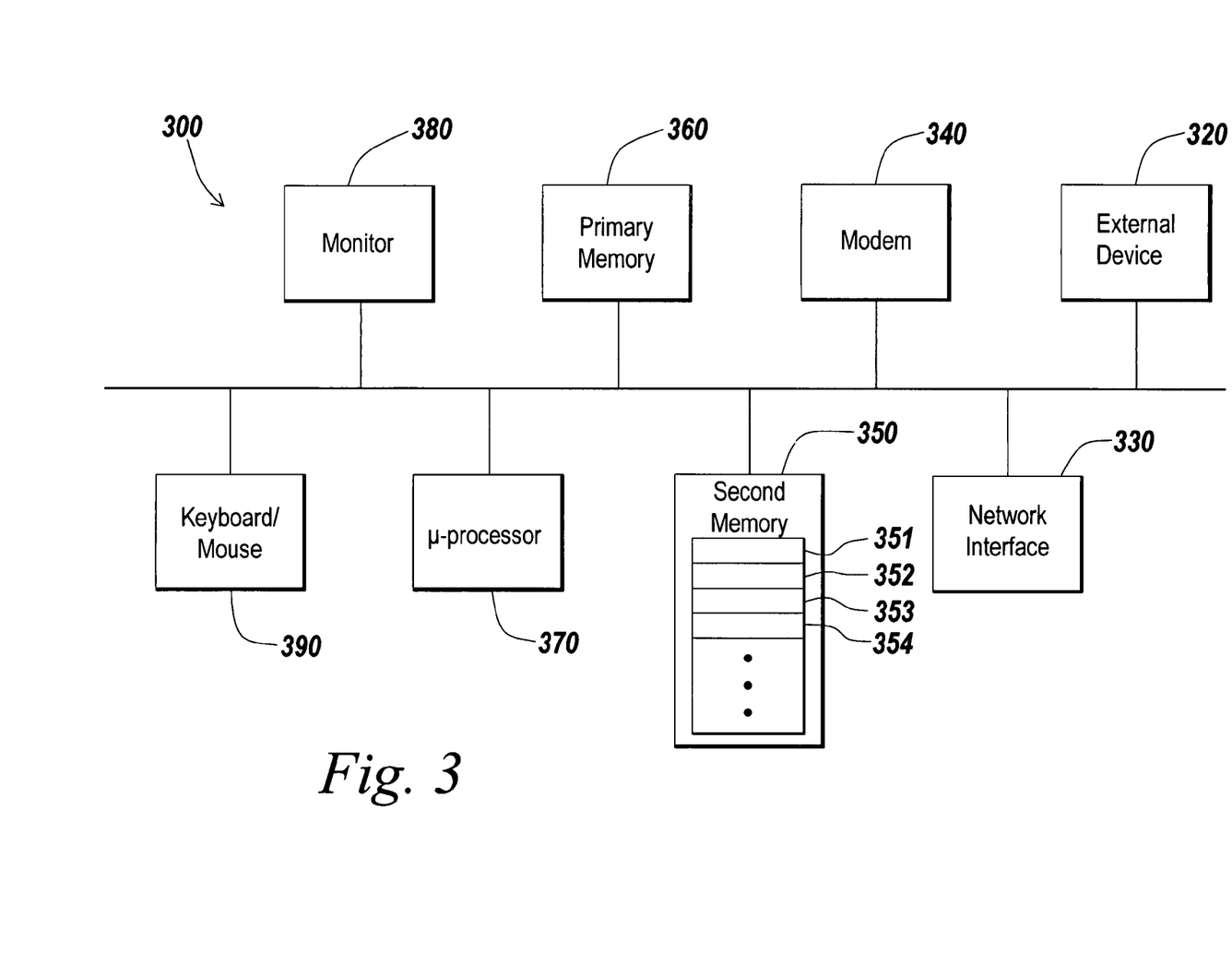
FIG. 3 is an electronic device suitable for practicing the illustrative embodiment; of the present invention.

FIG. 3 is an exemplary electronic device 300 suitable for practicing the illustrative embodiment of the present invention. The electronic device 300 includes a network interface 330, a MODEM 340, a secondary memory 350, a primary memory 360, a microprocessor 370, a monitor 380 and a keyboard/mouse 390. The electronic device 300 may be interfaced with external devices 250, such as data acquisition devices and measuring instruments. One of skill in the art will appreciate that the interfaces between the electronic devices 300 and the external devices 250 may include serial and parallel interfaces. The microprocessor 370 controls each component of the electronic device 300 to run the software tools in the graphical test environment 100 properly. The electronic device 300 receives through the keyboard/mouse 390 the input data necessary for editing the sequence of test steps and specifying the variables and parameters of the test steps so that the test steps are executed in the test environment 100. The electronic device 300 displays in the monitor 380 the user interface that provides the sequence of test steps and the properties of a selected test step. The primary memory 360 fetches from the secondary memory 350 and provides to the microprocessor 370 the codes that need to be accessed by the microprocessor 370 to operate the electronic device 200 and to run the test environment 100. The secondary memory 350 usually contains software tools for applications. The secondary memory 250 includes, in particular, code 351 for the MATLAB® 210 software tool, code 352 for the SIMULINK® 220 software tool, code 353 for Toolboxes 230 and code 354 for the test tool 120. The network interface 330 and the MODEM 340 enable the electronic device 300 to communicate with other electronic devices through communication networks, such as Internet, intranet, LAN (Local Area Network), WAN (Wide Area Network) and MAN (Metropolitan Area Network). The communication facilities may support for the distributed implementations of the present invention.

Figure 4A:
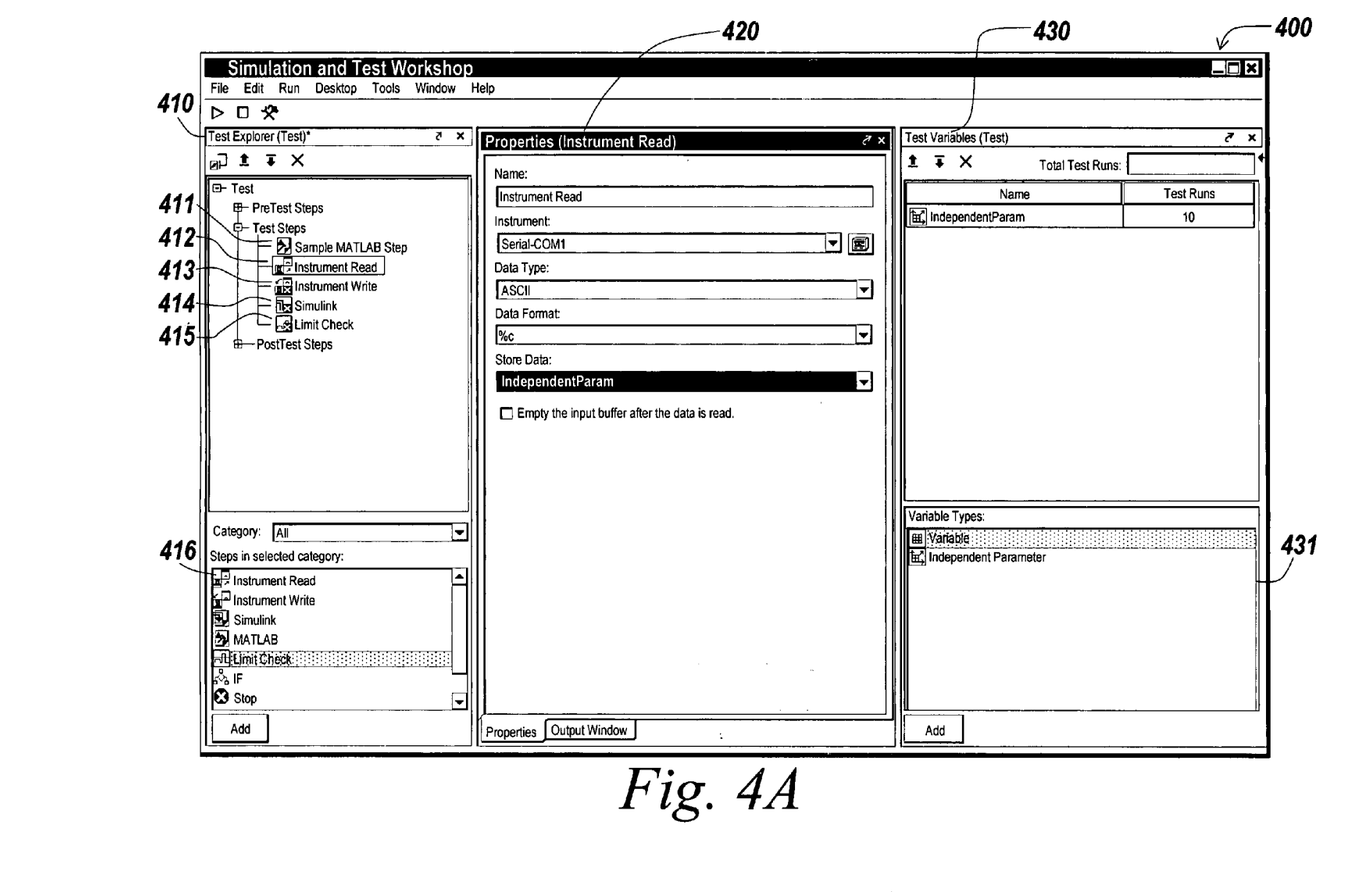
FIGS. 4A and 4B are exemplary graphical user interfaces (GUIs) that depict the test step of Instrument Read as a selected test step in the sequence of test steps in the illustrative embodiment of the present invention.

FIG. 4A is an exemplary graphical user interface 400 provided in Simulation & Test in the illustrative embodiment of the present invention depicted in FIG. 2. The user interface 400 includes Test Explorer 410, Properties 420 and Test Variables 430. The user interface 400 combines Test Explorer 410, Properties 420 and Test Variables 430 in a window in the illustrative embodiment of the present invention. One of skill in the art will appreciate that Test Explorer 410, Properties 420 and Test Variables 430 may be provided in separate windows.

The user interface 400 may be generated by subclassing a JAVA desktop class for the four desktop clients, i.e., Test Explorer 410, Properties 420, Test Variables 430, and Output Window. These are mapped via XML (Extensible Mark-up Language) as clients to the desktop. Properties 410 sheets are produced via abstract factory design pattern such that only one user interface component is loaded in memory at one time. The JAVABEANS technology, from Sun Microsystems, Inc, Santa Clara, Calif., may provide the underlying architecture. Test Explorer 410 provides facilities enabling users to edit a sequence of test steps that the users want to be executed in the test environment 100. The users edit the sequence of test steps using the predetermined test steps provided in the box 416 of Test Explorer 410. The predetermined test steps may be implemented as objects that are the members of classes. The classes have properties and methods that characterize any member (test step) of the classes. The properties of a test step are the data associated with the test step and determine the attributes of the test step. The properties of the test step are described below in more detail with reference to Properties 420. The predetermined test steps may be compiled into class files and included in the box 416 by XML mapping of the class files to the lower box 416. The users may select a category of the test steps in the box 416 so that the test steps of the selected category may be provided in the box 416. The users may add one or more of the test steps in the box 416 to the sequence of test steps edited in Test Explorer 410. The test steps in the box 416 may include Instrument Read, Instrument Write, SIMULINK® tests, MATLAB® tests, Limit Check, IF, Stop, etc. One of skill in the art will appreciate that the test steps shown in the box 416 are illustrative and the test steps may include other test steps necessary to edit the sequence of test steps in Test Explorer 410. The test steps of Instrument Read and Instrument Write test the operation of reading and writing data from/to external devices 250, respectively. The test steps of SIMULINK® and MATLAB® software tools test the program or model files generated in the SIMULINK® and MATLAB® environments, respectively. The test step of Limit Check checks data whether the selected test data points exceed a set limit. If the data exceed the limit, a user-specified action occurs, including Keep Testing, Stop This Test Run, and Stop All Test Runs. Each of the test steps in the box 416 may be added to the sequence of test steps based on the users' selection. In the example shown in FIG. 4A, the sequence of test steps includes Sample MATLAB® step 411, Instrument Read 412, Instrument Write 413, SIMULINK® test step 414 and Limit Check 415. One of skill in the art will appreciate that the sequence of test steps shown in FIG. 4A is illustrative and users may edit a different sequence of test steps.

Each test step in the sequence of test steps edited in Test Explorer 410 is an object with associated properties and a subset of these properties may be displayed on property sheet, such as those shown as 420. On the users' selection of a test in the sequence of test steps; Properties 420 provide various properties of a selected test step in the sequence of test steps in Test Explorer 410. The properties of the selected test step provided in Properties 420 include the properties of the selected test step that should be specified in order for the selected test step to be executed in the test environment 100. In the example shown in FIG. 4A, Instrument Read 412 is selected in the sequence of test steps in Test Explorer 410. Properties 420 display the properties of Instrument Read 412 test step including Name, Instrument, Data Type, Data Format, and Store Data. In the Example shown in FIG. 4A, the properties of the Instrument Read 412 test step are specified as Instrument Read for Name, Serial-Com for Instrument, ASCII for Data Type, % c for Data Format and Independent Parameter for Store Data. One of skill in the art will appreciate that the properties of Instrument Read 412 test step shown in Properties 420 are illustrative and the properties of Instrument Read 412 test step may be different depending on the external devices 250 from which data is read and the data that is read from the external devices 250.

The properties of the selected test step may include variables the types of which should be specified in order for the selected test step to be executed in the test environment 100. The user interface 400 includes Test Variables 430 that enable users to select the types of variables used in a selected test step. Test Variables 430 provide in a box 431 the variable types provided in the test environment 100 so that the users may select one or more of the variable types from the box 431. In the Example shown in FIG. 4A, Variables and Independent Parameter are provided in the box 431 and Independent Parameter is selected from the box 431 as the type of the variables used in the selected test step.

Figure 4B:
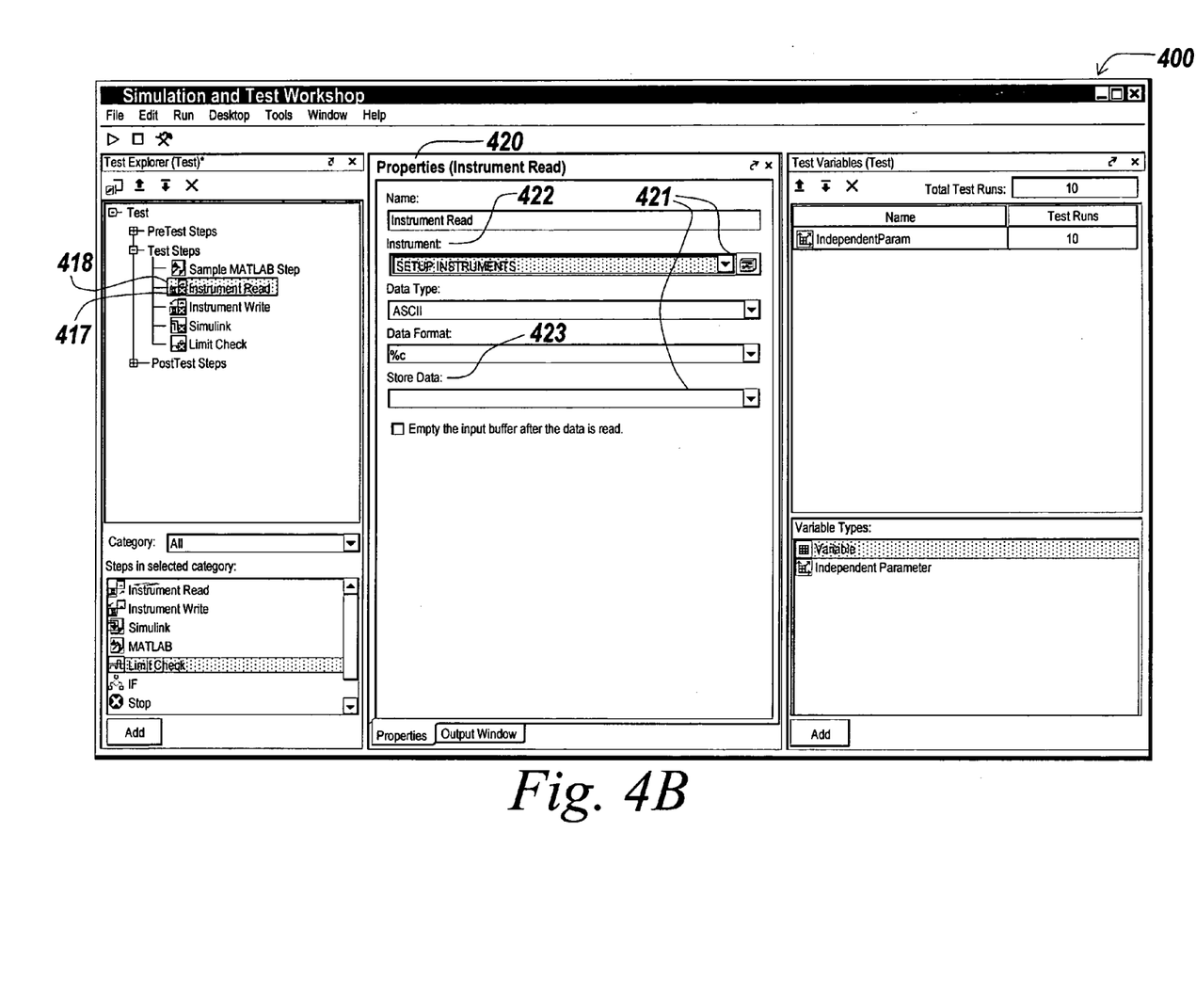

FIGS. 4A and 4B depict exemplary user interfaces 400 and 400' that depict Instrument Read as a selected test step in the sequence of test steps in the illustrative embodiment of the present invention. The interfaces 400 and 400' compare the Instrument Read 412 test step that is executable and that is not executable in the test environment 100. FIG. 4A shows that the Instrument Read 412 test step is executable in the test environment 100. Properties 420 displays the properties of the Instrument Read 412 test step including Instrument Read for Name, Serial-Com for Instrument, ASCII for Data Type, % c for Data Format and Independent Parameter for Store Data. In contrast, FIG. 4B shows that the Instrument Read 412 test step is not executable in the test environment 100. On the selection of the Instrument Read 412 test step, the test environment 100 examines the properties of the Instrument Read 412 test step and determines whether the properties of the Instrument Read 412 test step are specified so that the Instrument Read 412 test step is executed in the test environment 100. If the Instrument Read 412 test step is not executable in the test environment 100, Test Explorer 410 displays a graphical user interface element associated with the representation of the Instrument Read 412 test step in the sequence of test steps. The graphical user interface element indicates that the Instrument Read 412 test step is not executable in the test environment 100. In the example shown in FIG. 4B, an x-mark icon 417 is displayed associated with the representation of Instrument Read 412 and the background 418 of the representation of Instrument Read 412 is colored dark. If the Instrument Read 412 test step is not executable in the test environment 100, Properties 420 displays the properties of the Instrument Read 412 test step that should be specified for the selected test step to be executed in the test environment 100. In the example shown in FIG. 4B, the blanks designated by Instrument 422 and Store Data 423 are enclosed with rectangular blocks 421 that inform the users that the blanks enclosed by the rectangular blocks 421 should be filed out to specify Instrument and the variable type of Store Data so that the selected test step can be executed in the test environment 100. One of skill in the art will appreciate that the rectangular block 421 may be displayed, for example, in red color.

Figure 5A:
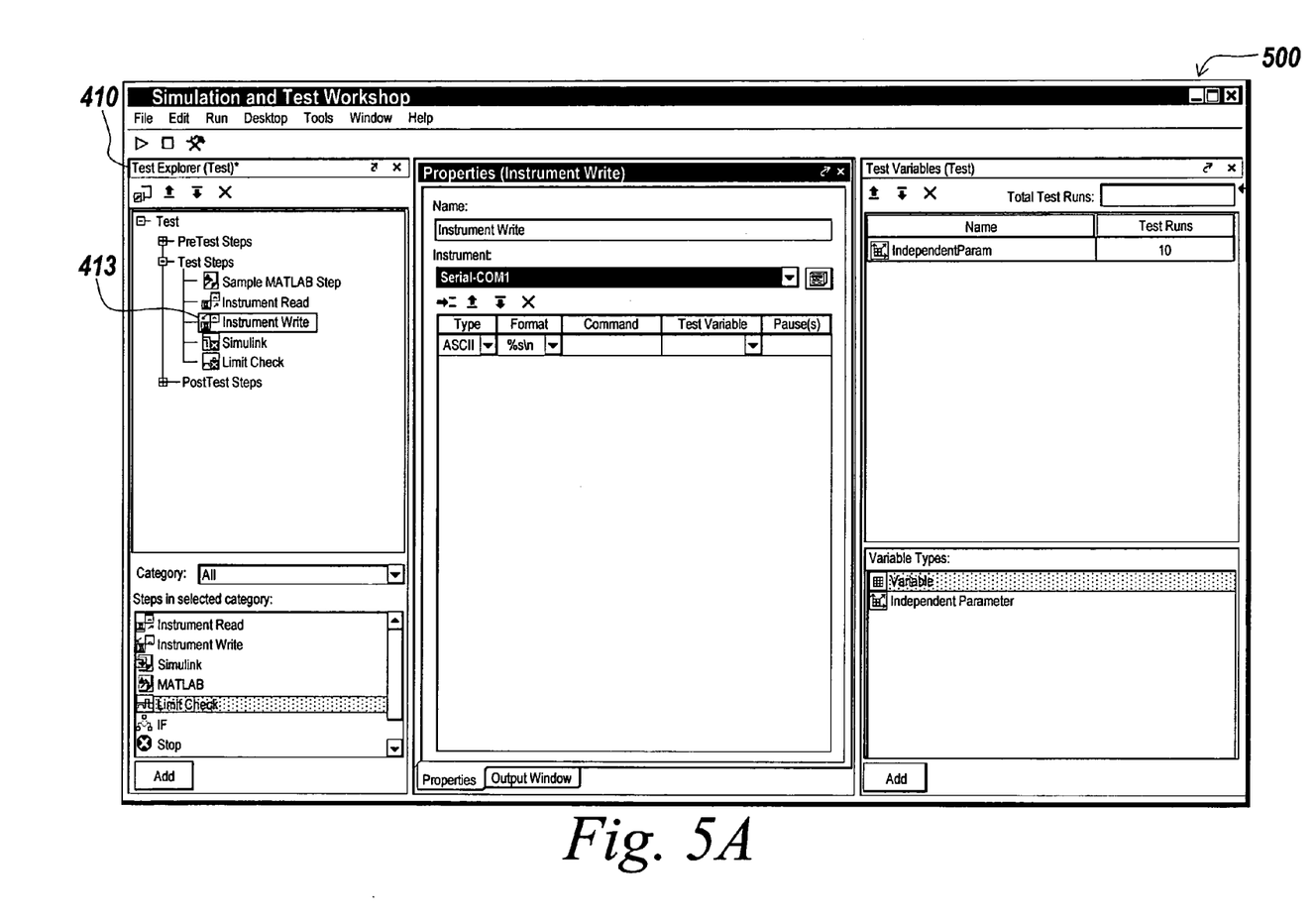
FIGS. 5A and 5B depict exemplary GUIs that depict the test step of Instrument Write as a selected test step in the sequence of test steps in the illustrative embodiment of the present invention.
Figure 5B:
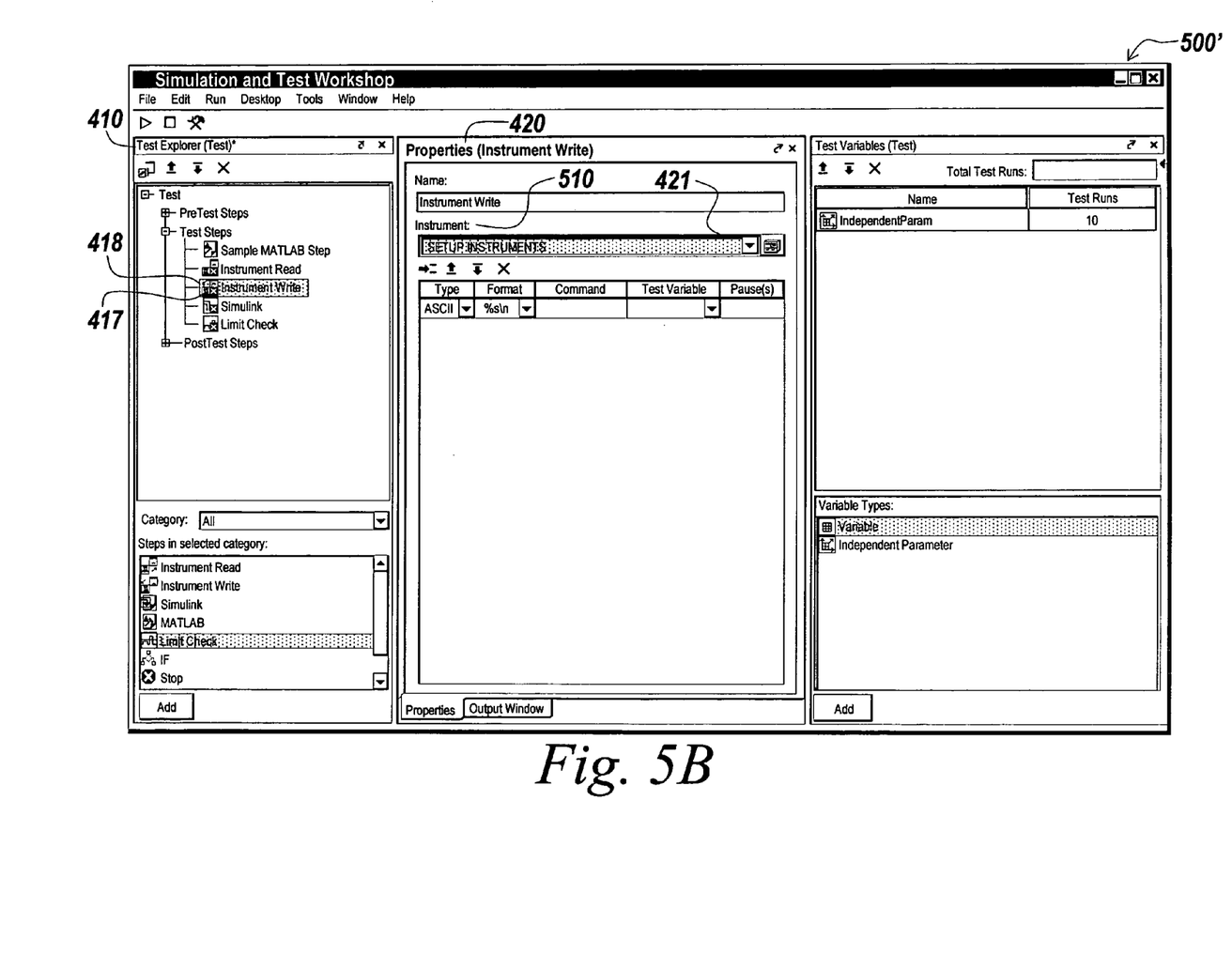

FIGS. 5A and 5B depict another set of exemplary user interfaces 500 and 500' that depict Instrument Write 413 as a selected test step in the sequence of test steps in the illustrative embodiment of the present invention. The interfaces 500 and 500' compare an Instrument Write 413 test step that is executable and with a step that is not executable in the test environment 100. FIG. 5A depicts that the selected Instrument Write 413 test step is executable in the test environment 100. Properties 420 display the properties of the Instrument Write 413 test step including Instrument Write for Name, Serial-COM 1 for Instrument, ASCII for Type, % s\n for Format. In contrast, FIG. 5B depicts that the Instrument Write 413 test step is not executable in the test environment 100. On the selection of the Instrument Write 413 test step, the test environment 100 examines the properties of the Instrument Write 413 test step and determines whether the properties of the Instrument Write 413 test step are specified so that the Instrument Write 413 test step is executed in the test environment 100. If Instrument Write 413 is not executable in the test environment 100, Test Explorer 410 displays a graphical user interface described above with reference to FIGS. 4A and 4B. If the Instrument Write 413 test step is not executable in the test environment, Properties 420 displays the properties of the selected test step that should be specified for the Instrument Write 413 test step to be executed in the test environment 100. In the example shown in FIG. 5B, the blank designated by Instrument 510 is enclosed with a rectangular block 421 that informs the users that the blank enclosed by the rectangular block 421 should be filed out to specify Instrument so that the Instrument Write 413 test step can be executed in the test environment 100. As described above with reference to FIGS. 4A and 4B, the rectangular block 421 may be colored.

Figure 6A:
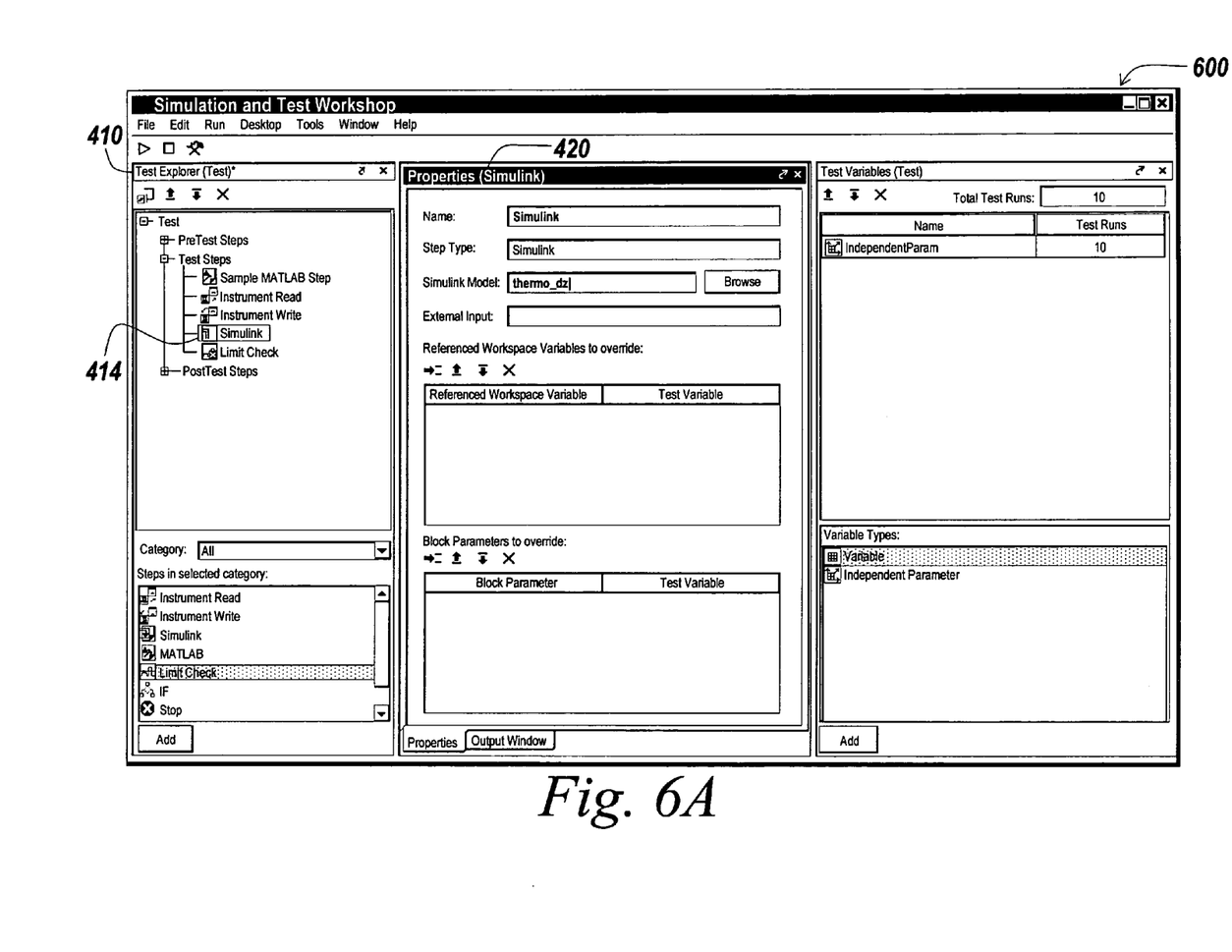
FIGS. 6A and 6B depict exemplary GUIs that depict the SIMULINK® test step as a selected test step in the sequence of test steps in the illustrative embodiment of the present invention.
Figure 6B:
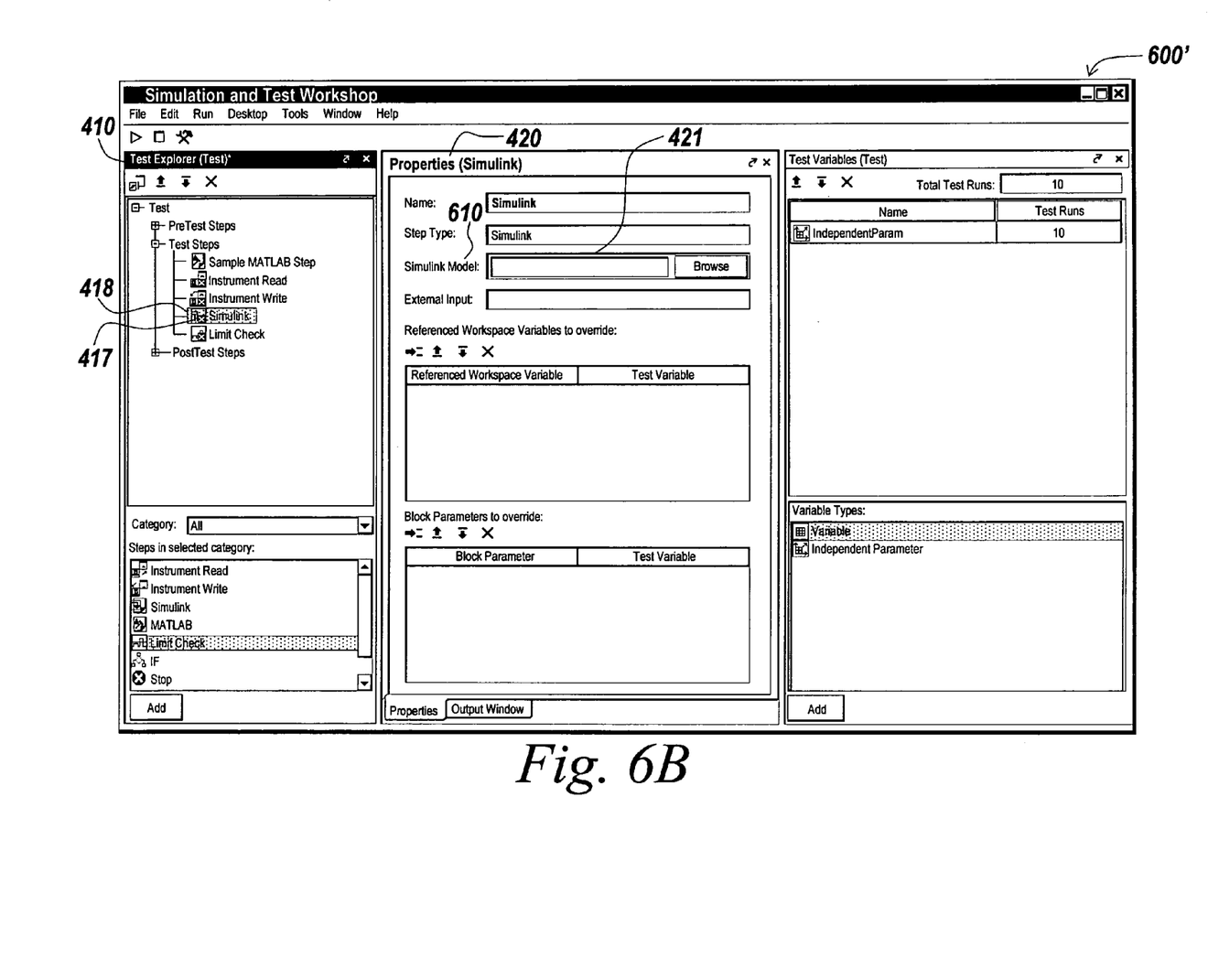

FIGS. 6A and 6B depict another set of exemplary user interfaces 600 and 600' that depict SIMULINK® test step 414 as a selected test step in the sequence of test steps in the illustrative embodiment of the present invention. The interfaces 600 and 600' compare the SIMULINK® 414 test step that is executable and with a step that is not executable in the test environment 100. FIG. 6A depicts that the SIMULINK® 414 test step is executable in the test environment 100. Properties 420 provide the properties of the SIMULINK® 414 test step including SIMULINK® for Name, thermo-dz for SIMULINK® Model, which are needed for the SIMULINK® 413 test step to be executed in the test environment 100. In contrast, FIG. 6B depicts that the SIMULINK® 414 test step is not executable in the test environment 100. On the selection of the SIMULINK® 414 test step in the sequence of test steps in Test Explorer 410, the test environment 100 examines the properties of the SIMULINK® 414 test step and determines whether the properties of the SIMULINK® 414 test step are specified for the SIMULINK® 414 test step to be executed in the test environment 100. If the SIMULINK® 414 test step is not executable, the test environment displays a graphical user interface element described above with reference to FIGS. 4A and 4B. If the SIMULINK® 414 test step is not executable in the test environment 100, Properties 420 displays the properties of the SIMULINK® 414 test step that should be specified for the SIMULINK® 414 test step to be executable in the test environment 100. In the example shown in FIG. 6B, the blank designated by SIMULINK® Model 610 is enclosed by a rectangular block 421 that informs the users that the blank enclosed by the rectangular block 421 should be filed out to specify a SIMULINK® Model so that the SIMULINK® 414 test step can be executed in the test environment 100. As described above with reference to FIGS. 4A and 4B, the rectangular block 421 may be colored.

Figure 7A:
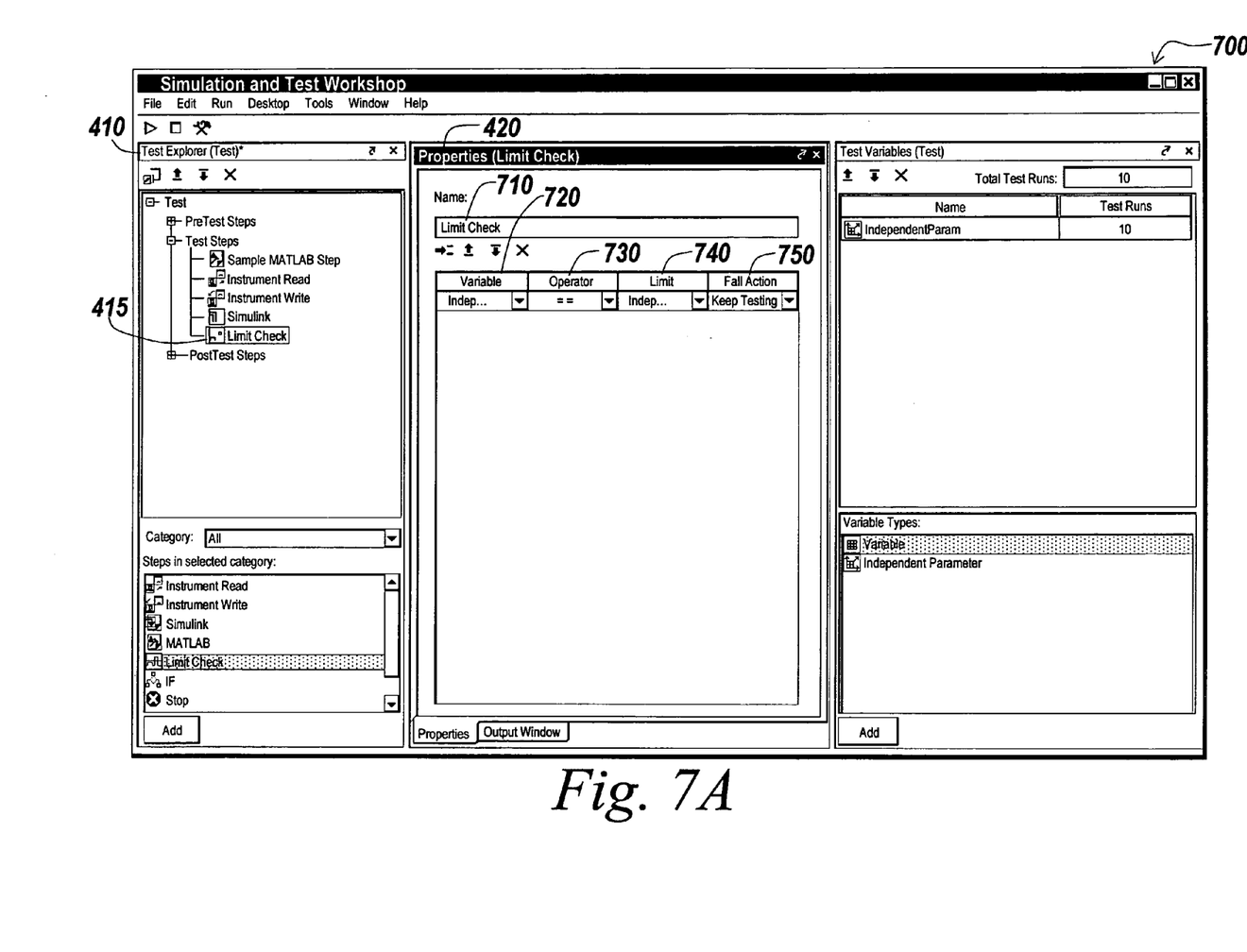
FIGS. 7A and 7C depict exemplary GUIs that depict the test step of Limit Check as a selected test step in the sequence of test steps in the illustrative embodiment of the present invention.
Figure 7B:
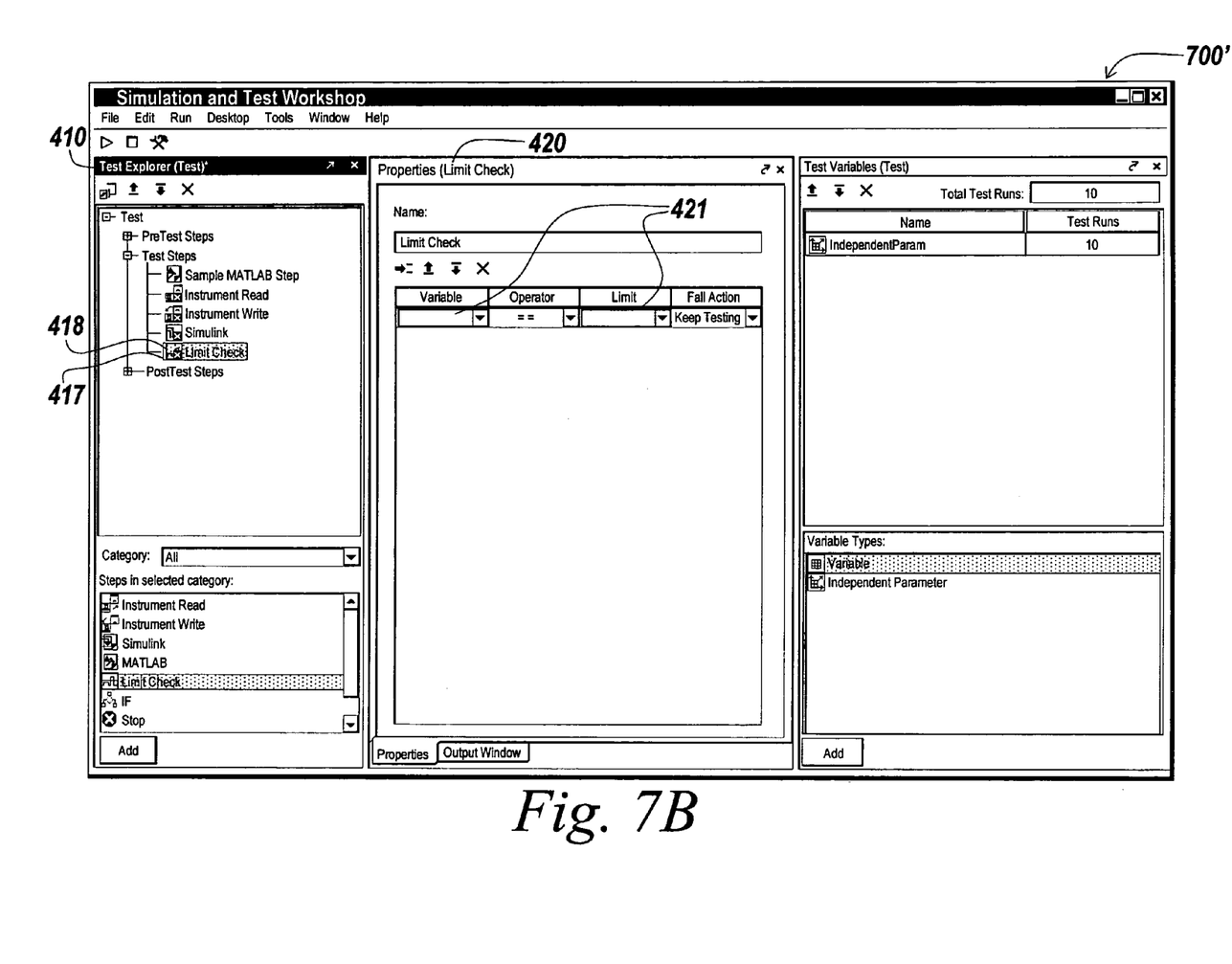

FIGS. 7A and 7B depict a set of exemplary user interfaces 700 and 700' that depict Limit Check 415 as a selected test step in the sequence of test in the illustrative embodiment of the present invention. The interfaces 700 and 700' compare the Limit Check 415 test step that is executable and with a step that is not executable in the test environment 100. FIG. 7A depicts that the Limit check 415 test step is executable in the test environment 100. Properties 420 display the properties of the Limit check 415 test step including Limit Check for Name 710, Independent Parameter for Variable 720, ═for Operator 730, Independent Parameter for Limit 740, Keep Testing for Fall Action 750. In contrast, FIG. 7B depicts that the Limit Check 415 test step is not executable in the test environment 100. On the selection of the Limit Check 415 test step, the test environment 100 examines the properties of the Limit Check 415 test step and determines whether the properties of the Limit Check 415 test step are specified so that the Limit Check 415 test step is executable in the test environment 100. If the Limit Check 415 test step is not executable in the test environment 100, Test Explorer 410 displays a graphical user interface described above with reference to FIGS. 4A and 4B. If the Limit Check 415 test step is not executable in the test environment 100, Properties 420 displays the properties of the Limit Check 415 test step that should be specified for the Limit Check 415 test step to be executed in the test environment 100. In the example shown in FIG. 7B, the blanks designated by Variable 720 and Limit 740 is enclosed with rectangular blocks 421 that informs the users that the blanks enclosed by the rectangular blocks 421 should be filed out to specify the variable type of Variable 720 and Limit 740 so that the Limit Check 415 test step can be executed in the test environment 100.

Figure 7C:
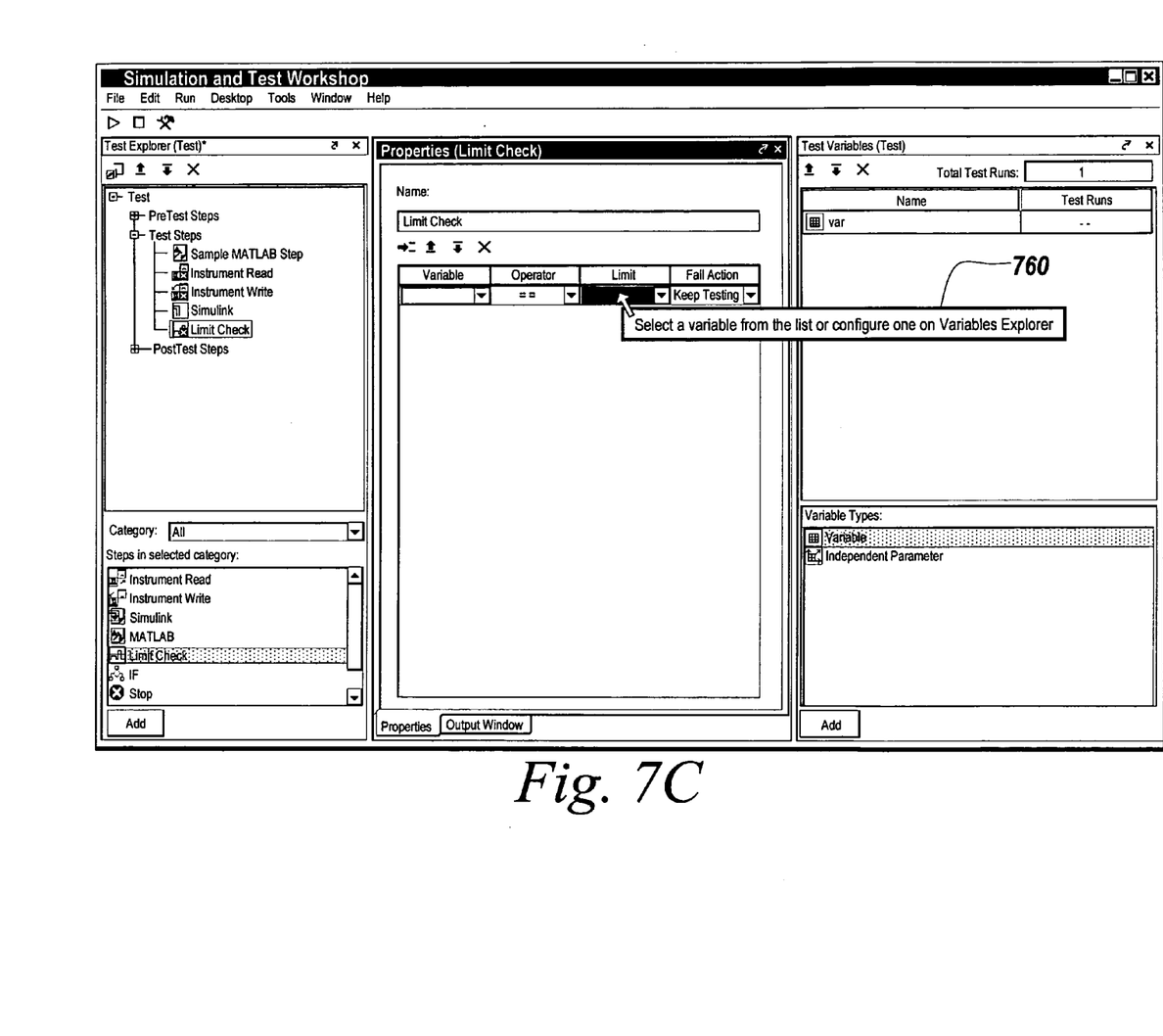

FIG. 7C displays an exemplary user interface providing users with a message that enables the users to fill out the blanks enclosed by the rectangular blocks 421 depicted in FIG. 7B. The message leads the users to fill out the blanks and overcome the non executable condition of the Limit Check 415 test step in the illustrative embodiment of the present invention. If users hover the pointing device 390 over the rectangular block 421 shown in FIG. 7B, the test environment 100 may provide a user interface 760 in a pop-up window that contains information on how to fill out the blank to make the selected test step executable in the test environment 110 ("Select a Variable from the list or configure one on Variable Explorer"). One of skill in the art will appreciate that the user interface element 760 may be provided with reference to FIGS. 4B, 5B and 6B.

In summary, the illustrative embodiment of the present invention provides test environments for monitoring test steps. The illustrative embodiment of the present invention provides functionality for monitoring a test step in the sequence of test steps and informs users whether the test step is executable in the test environment. The illustrative embodiment of the present invention provides the properties of the selected test step that should be specified in order for the selected test step to be executed in the test environment. If the users select a test step in the sequence of test steps, the test environment in the illustrative embodiment of the present invention examines the properties of the selected test step and determines whether the selected test step is executable in the test environment. If the selected test step is not executable, the test environment provides a graphical user interface associated with the representation of the selected test step to inform the users that the selected test step is not executable in the test environment. The illustrative embodiment of the present invention also provides another graphical use interface associated with the blanks in which the missing properties of the selected test step should be specified. The illustrative embodiment of the present invention may further provide additional user interface that contains messages on how to fill out the blanks.

It will thus be seen that the invention attains the objectives stated in the previous description. Since certain changes may be made without departing from the scope of the present invention, it is intended that all matter contained in the above description or shown in the accompanying drawings be interpreted as illustrative and not in a literal sense. For example, the illustrative embodiment of the present invention may be practiced in any test environment that provides facilities for monitoring test steps. Practitioners of the art will realize that the sequence of steps and architectures depicted in the figures may be altered without departing from the scope of the present invention and that the illustrations contained herein are singular examples of a multitude of possible depictions of the present invention.

We claim:
1. A method comprising:
  presenting a first user interface element on a display,
    presenting the first user interface element being performed by a device, and
    the first user interface element providing a listing of names of a plurality of test steps included in a sequence of test steps,
      the sequence of test steps including at least a first test step and a second test step that are part of a test for testing whether a functionality provided by a software program is performed as desired in a test environment of the device;

receiving a selection, via the first user interface element, of the first test step or the second test step,
  receiving the selection being performed by the device, and
  the first test step or the second test step being selected by selecting a name included in the listing of names;
determining, programmatically and based on the selection, that the selected test step is not in an executable condition in the test environment of the device,
  determining that the selected test step is not in the executable condition being performed by the device;
presenting an icon via the first user interface element,
  presenting the icon being performed by the device, and
  the icon indicating that the selected test step is not in the executable condition in the test environment of the device;
presenting, for display, a second user interface element associated with the selected test step,
  presenting the second user interface element being performed by the device,
  the second user interface including an icon indicating that the selected test step is not in the executable condition in the test environment of the device, and
  the second user interface element providing a listing of at least one property of the selected test step; and
presenting an indicator via the second user interface element,
  the indicator indicating that a designated one of the at least one property of the selected test step is not in the executable condition of the test environment of the device and that the designated one of the at least one property requires specification for the selected test step to be in the executable condition.

2. The method of claim 1, where the first user interface element enables the sequence of test steps to be edited.

3. The method of claim 1, where the first user interface element further provides visual representations of a pool of predetermined test steps, and
  where the visual representations are selectable to add one or more test steps included in the pool of predetermined test steps to the sequence of test steps.

4. The method of claim 3, where each test step included in the pool of predetermined test steps is added to the sequence of test steps based on a user selection of the visual representation of the test step.

5. The method of claim 1, where the software program includes a textual programming tool, and
  where the sequence of test steps includes a test step for testing a program generated using the textual programming tool.

6. The method of claim 1, where the software program includes a graphical programming tool, and
  where the sequence of test steps includes a test step for testing a model created using the graphical programming tool.

7. A method comprising:
providing, for display via a first user interface element, a listing of names of a plurality of test steps included in a sequence of test steps,
  providing the listing of names for display being performed by a device, and
  the sequence of test steps including a first test step and a second test step that are part of a test for testing whether a functionality provided by a software program is performed as desired in a test environment of the device;
receiving a selection of the first test step or the second test step,
  the selection being made by selecting a name of the first test step or the second test step included in the listing of names,
  receiving the selection being performed by the device;
determining, programmatically and based on the selection, that the selected test step is not in an executable condition in the test environment of the device,
  determining that the selected test step is not in the executable condition being performed by the device;
providing a second user interface element for display,
  the second user interface element including an icon indicating that the selected test step is not in the executable condition in the test environment of the device; and
providing, for display via the second user interface element, an indicator indicating that:
  at least one property of the selected test step is not in the executable condition in the test environment of the device, and
  the at least one property requires specification for the selected test step to be executable in the test environment,
    providing the indicator for display being performed by the device.

8. The method of claim 7, where the at least one property of the selected test step includes types of variables used in the selected test step.

9. The method of claim 8, further comprising:
providing a listing of the types of variables for display.

10. The method of claim 7, further comprising:
providing at least one field for entering a value of the at least one property for display.

11. The method of claim 10, further comprising:
providing an element associated with the at least one field for display,
  the element indicating that the at least one field is to be filled for the selected test step to be in the executable condition in the test environment of the device.

12. The method of claim 11, where the element includes a box enclosing the at least one field.

13. The method of claim 7, further comprising:
providing an element for display when a pointing device hovers over the indicator,
  the element displaying information indicating how to make the selected step executable in the test environment.

14. The method of claim 13, where the element is provided in a pop up window.

15. The method of claim 7, where the software program includes a graphical programming tool, and
  where the at least one property of the selected test step includes a name of a model file when testing a model created in the graphical programming tool.

16. The method of claim 7, where the functionality includes testing a reading of data from an external instrument, and
  where the at least one property of the selected test step includes a name of the external instrument when testing the reading of the data from the external instrument.

17. The method of claim 7, where functionality includes testing a writing of data to an output port, and
  where the at least one property of the selected test step includes a name of the output port when testing the writing of the data to the output port.

18. A non-transitory computer-readable medium storing instructions, the instructions comprising:
one or more instructions that, when executed by a processor of a device, cause the processor to:
present a first user interface element on a display,
the first user interface element presenting a listing of names of a plurality of test steps included in a sequence of test steps,
the sequence of test steps including at least a first test step and a second test step that are part of a test for testing whether a functionality provided by a software program is performed as desired in a test environment of the device;
receive a selection, via the first user interface element, of the first test step or the second test step,
the first test step or the second test step being selected by selecting a name included in the listing of names;
determine, programmatically and based on the selection, that the selected test step is not in an executable condition; and
present, for display, a second user interface element associated with the selected test step,
the second user interface element including an icon indicating that the selected test step is not in the executable condition in the test environment of the device,
the second user interface element presenting a listing of at least one property of the selected test step, and
the second user interface element including an indicator indicating that a designated one of the at least one property of the selected test step is not in the executable condition in the test environment of the device and that the designated one of the at least one property requires specification for the selected test step to be in the executable condition in the test environment of the device.

19. A non-transitory computer-readable medium storing instructions, the instructions comprising:
one or more instructions that, when executed by a device, cause the device to:
present, via a first user interface element, a listing of names of a plurality of test steps included in a sequence of test steps,
the sequence of test steps including at least a first test step and a second test step that are part of a test for testing whether functionality provided by a software program is performed as desired in a test environment of the device;
receive a selection of the first test step or second test step of the plurality of test steps included in the sequence of test steps,
the first test step or the second test step being selected by selecting a name included in the listing of names;
present, for display, a listing of at least one property of the selected test step;
determine, programmatically and as a result of the selection, that the selected test step is not executable in the test environment of the device; and
present, for display, a second user interface element,
the second user interface element including:
an icon indicating that the selected test step is not in an executable condition in the test environment of the device, and;
an indicator indicating that at least one property of the selected test step requires specification for the selected test step to be in the executable condition in the test environment of the device.

20. A system comprising:
an electronic device to:
present, for display, a first user interface element displaying a listing of names of a plurality of test steps included in a sequence of test steps,
the sequence of test steps including at least a first test step and a second test step that are part of a test for testing whether a functionality provided by a software program is performed as desired in test environment of the electronic device,
the first user interface element enabling a receipt of a selection of the first test step or the second test step in the sequence of test steps,
the first test step or the second test step being selected by selecting a name in the listing of names;
determine, programmatically and based on the selection, that the selected test step is not in an executable condition in the test environment of the electronic device;
present, for display, a second user interface element that includes:
an icon indicating that the selected test step is not in the executable condition in the test environment of the electronic device,
a listing of at least one property of the selected test step, and
an indicator indicating that the at least one property requires specification for the selected test step to be in the executable condition in the test environment of the electronic device.

21. The system of claim 20, where the first user interface element enables the sequence of test steps to be edited.

22. The system of claim 20, where the first user interface element includes visual representations of predetermined test steps that, when selected by a user, are to be added to the sequence of test steps.

23. The system of claim 20, where the sequence of test steps includes at least one of a test step for testing a program generated using a textual programming tool or a test step for testing a model created using a graphical programming tool.

* * * * *